US012009486B2

(12) United States Patent
Qin et al.

(10) Patent No.: US 12,009,486 B2
(45) Date of Patent: Jun. 11, 2024

(54) SAFE AND HIGH-ENERGY USB RECHARGEABLE BATTERY

(71) Applicant: EVE ENERGY CO., LTD, Huizhou (CN)

(72) Inventors: Dasheng Qin, Huizhou (CN); Jincheng Liu, Huizhou (CN); Baobing Zhang, Huizhou (CN); Mujian Li, Huizhou (CN); Yumei Chen, Huizhou (CN)

(73) Assignee: EVE ENERGY CO., LTD., Huizhou (CN)

( * ) Notice: Subject to any disclaimer, the term of this patent is extended or adjusted under 35 U.S.C. 154(b) by 777 days.

(21) Appl. No.: 16/611,162

(22) PCT Filed: Nov. 6, 2017

(86) PCT No.: PCT/CN2017/109592
§ 371 (c)(1),
(2) Date: Nov. 5, 2019

(87) PCT Pub. No.: WO2019/084973
PCT Pub. Date: May 9, 2019

(65) Prior Publication Data
US 2020/0161713 A1    May 21, 2020

(51) Int. Cl.
*H01M 10/42* (2006.01)
*H01M 10/46* (2006.01)
(Continued)

(52) U.S. Cl.
CPC ..... *H01M 10/425* (2013.01); *H01M 10/4257* (2013.01); *H01M 10/46* (2013.01);
(Continued)

(58) Field of Classification Search
None
See application file for complete search history.

(56) References Cited

U.S. PATENT DOCUMENTS 6,205,034 B1    3/2001  Zayatz
6,831,827 B1   12/2004  Zayatz
(Continued)

FOREIGN PATENT DOCUMENTS

CN    102299392 A    12/2011
CN    103311676 A     9/2013
(Continued)

OTHER PUBLICATIONS

Machine English translation of JPH08115714A originally published to Yamamoto May 1996 (Year: 1996).*

(Continued)

*Primary Examiner* — Ula C Ruddock
*Assistant Examiner* — Mary Grace Byram
(74) *Attorney, Agent, or Firm* — Hunton Andrews Kurth LLP

(57) ABSTRACT

Disclosed is a rechargeable battery having an integrated cell (12, 21, 33, 42). The rechargeable battery having an integrated cell (12, 21, 33, 42) includes a protective circuit board (11, 32, 41) disposed at the top of the battery and a cell (12, 21, 33, 42) disposed at the base of the battery. The cell includes a jellyroll (121, 43) and a metal housing (122, 22, 313, 44). The protective circuit board (11, 32, 41) is disposed on a protective board support structure (13, 36, 45). The cell (12, 21, 33, 42) is electrically connected to the protective circuit board (11, 32, 41) through a socket (14, 35, 46) disposed on the protective circuit board (11, 32, 41). A USB interface (15, 47) for charging the battery is disposed on the protective circuit board (11, 32, 41).

21 Claims, 12 Drawing Sheets

(51) Int. Cl.

| | |
|---|---|
| *H01M 50/107* | (2021.01) |
| *H01M 50/119* | (2021.01) |
| *H01M 50/143* | (2021.01) |
| *H01M 50/152* | (2021.01) |
| *H01M 50/176* | (2021.01) |
| *H01M 50/179* | (2021.01) |
| *H01M 50/184* | (2021.01) |
| *H01M 50/202* | (2021.01) |
| *H01M 50/213* | (2021.01) |
| *H01M 50/247* | (2021.01) |
| *H01M 50/271* | (2021.01) |
| *H01M 50/287* | (2021.01) |
| *H01M 50/296* | (2021.01) |
| *H01M 50/342* | (2021.01) |
| *H01M 50/383* | (2021.01) |
| *H01M 50/50* | (2021.01) |
| *H01M 50/553* | (2021.01) |
| *H01M 50/559* | (2021.01) |
| *H01M 50/578* | (2021.01) |
| *H01M 50/548* | (2021.01) |

(52) U.S. Cl.
CPC ....... *H01M 50/107* (2021.01); *H01M 50/119* (2021.01); *H01M 50/143* (2021.01); *H01M 50/152* (2021.01); *H01M 50/176* (2021.01); *H01M 50/179* (2021.01); *H01M 50/184* (2021.01); *H01M 50/202* (2021.01); *H01M 50/213* (2021.01); *H01M 50/247* (2021.01); *H01M 50/271* (2021.01); *H01M 50/287* (2021.01); *H01M 50/296* (2021.01); *H01M 50/3425* (2021.01); *H01M 50/383* (2021.01); *H01M 50/50* (2021.01); *H01M 50/553* (2021.01); *H01M 50/559* (2021.01); *H01M 50/578* (2021.01); *H01M 50/548* (2021.01); *H01M 2200/20* (2013.01); *H01M 2220/00* (2013.01); *H01M 2220/30* (2013.01); *Y02E 60/10* (2013.01)

(56) References Cited

U.S. PATENT DOCUMENTS

| | | | | |
|---|---|---|---|---|
| 2002/0119367 | A1* | 8/2002 | Watanabe | H01M 10/0436 429/129 |
| 2006/0108979 | A1 | 5/2006 | Daniel et al. | |
| 2009/0081530 | A1* | 3/2009 | Hashimoto | H01M 50/536 429/185 |
| 2009/0151863 | A1* | 6/2009 | Teramoto | H01M 50/56 425/141 |
| 2010/0151317 | A1* | 6/2010 | Kim | H01M 50/155 429/163 |
| 2012/0262083 | A1* | 10/2012 | Liu | H01M 10/425 315/290 |
| 2016/0336551 | A1* | 11/2016 | Wang | H01M 50/176 |
| 2017/0077485 | A1 | 3/2017 | Fujiwara et al. | |

FOREIGN PATENT DOCUMENTS

| | | | | |
|---|---|---|---|---|
| CN | 103840105 | A | | 6/2014 |
| CN | 205016605 | U | | 2/2016 |
| CN | 205960150 | U | | 2/2017 |
| CN | 107681068 | A | | 2/2018 |
| CN | 107681088 | A | | 2/2018 |
| EP | 3062368 | A1 | | 8/2016 |
| JP | 08-115714 | A | | 5/1996 |
| JP | 08115714 | A | | 5/1996 |
| JP | H08115714 | A | * | 5/1996 ............ H01M 10/05 |
| JP | H113690 | A | | 1/1999 |
| KR | 20160134522 | A | | 11/2016 |
| WO | 2014069575 | A1 | | 5/2014 |

OTHER PUBLICATIONS

What's Inside A Battery, Raw Materials Company Inc., Apr. 6, 2014 (Year: 2014).*
Communication pursuant to Rule 164(1) EPC dated Aug. 10, 2021 issued in European Patent Application No. 17930780.6.
Int'l Search Report (PCT/CN2017/109592), dated May 4, 2018.
Korean Notification of Refusal (KR 10-2019-7021395), dated Oct. 20, 2020 (w/translation).
Notice of Reasons for Refusal (JP 2019-531616), dated Jul. 16, 2020.
European Search Report (EP 17930780.6), dated Aug. 10, 2021.
Extended European Search Report dated Jan. 24, 2022 issued in EP 17930780.6.

* cited by examiner

SAFE AND HIGH-ENERGY USB RECHARGEABLE BATTERY

CROSS REFERENCE TO RELATED APPLICATION

This is a National stage application, field under 37 U.S.C. 371 of International Patent Application NO. PCT/CN2017/109592, filed on Nov. 6, 2017, the contents of which is incorporated herein by reference in its entireties.

TECHNICAL FIELD

The present disclosure relates to the field of battery technologies and, in particular, to a rechargeable battery explosion-proof structure having an integrated cell, a cell assembly structure, and a safe and high-energy USB rechargeable battery.

BACKGROUND

As articles for daily use, batteries are widely used in various devices such as toys, keyboards, mice, remote controllers, cameras, model airplanes, flashlights, electronic door locks, electronic watches and other products. The batteries on the market include disposable carbon batteries and alkaline batteries as well as rechargeable nickel-manganese batteries, nickel-chromium batteries and nickel-hydrogen batteries. With the increasing maturity of the lithium battery technology and the advantages of lithium batteries, such as high energy density, fast charging, environmental protection and memory-free effects, rechargeable lithium batteries gradually appear in the market and tend to be popular. However, because of the high energy density and the characteristics of charging and discharging of lithium batteries, lithium batteries are likely to heat up, burn or even explode due to internal short-circuit of positive and negative electrodes during use, causing a potential safety hazard to the users.

At present, a lithium cell is encapsulated in a flexible package or a metal housing (like a steel housing or an aluminum housing). Heat emission and gas generation inside the cell encapsulated in the flexible package cause the cell housing to bulge and deform. The deformation helps release pressure and thus the probability of explosion is low in general. In contrast, the pressure in the cell encapsulated in the metal housing cannot be adjusted through the deformation of the metal housing. When the cell is abnormal, the pressure inside the cell accumulates and causes explosion finally. Thus, for the sake of safety, it is necessary to take effective measures to release pressure from the cell encapsulated in the metal housing when the pressure in the cell reaches a certain level.

A rechargeable lithium battery may be a USB battery integrated with a USB charging interface or a rechargeable lithium battery separated from a charger. The latter brings inconvenience to the user due to the need for a separate adapter.

The existing rechargeable lithium battery structure provided with a (built-in) USB interface is composed of a cell, a protection and voltage conversion circuit board, a housing and the like.

In the existing rechargeable lithium battery structure, the cell is encapsulated in a flexible package or a metal housing, and the protection and voltage conversion board is composed of a lithium cell protection circuit, a voltage conversion circuit and a charging management circuit. During charging, the battery is charged through the USB interface. The battery is discharged through a positive electrode cap that outputs a converted voltage like 1.5V. Other batteries like a 9V square battery output +9V voltage, and the negative electrode of the battery is the battery housing.

In the existing USB battery, "a battery protection, a charging management, a voltage conversion circuit, and a USB interface" are integrated and a large amount of space is occupied in the battery, thereby greatly limiting the battery capacity. In addition, the cell is separately designed. As a result, the space utilization further decreases, causing a significant decrease in the overall battery capacity. Currently, only approximately 1000 mAH can be achieved for a AA lithium battery and only approximately 400 mAH can be achieved for a AAA lithium battery on the market. In addition, under the condition that the cell is separately designed, the battery assembly is complex and, in particular, much difficulty is brought about in battery positive and negative electrode welding and grounding welding. Furthermore, since the cell is separately designed and built in a steel housing, even if the cell has a pressure relief design, it is also easy to cause a battery explosion and cause an accident if the external steel housing does not have a pressure relief channel.

Emerges on the market is another product pattern in which only "the battery management circuit and the voltage conversion circuit" are integrated inside the battery, and the charging management circuit is designed as a separate charger that can be connected to an AC adapter or a USB interface. A cell in this product pattern is still separately designed. The battery is composed of a cell, a protection and conversion circuit and a housing. The positive electrode cap outputs a converted voltage. For example, the positive electrode cap of a AA battery and the positive electrode cap of a AAA battery output +1.5V voltage, and the positive electrode cap of 9V square battery outputs +9V voltage. The negative electrode is the housing. Compared with the existing art, an externally disposed USB interface can save a large amount of space and increase the battery capacity.

The externally disposed USB interface saves the space of the battery, but increases costs and has an adverse impact on the portability and convenience of the battery. Since the cell is still separately designed, the capacity is still limited, the problem of explosion-proof persists, and the assembly is still complex.

The existing rechargeable lithium battery structure provided with a (built-in) USB interface is composed of a cell, a protection and voltage conversion circuit board (collectively referred to as a protective circuit board), a housing and the like. In the existing rechargeable lithium battery structure, the cell is encapsulated in a flexible package or a metal housing, and the protection board is composed of a protection circuit, a voltage conversion circuit and a charging management circuit. The cell is electrically connected to the protective circuit board in a welding manner. This manner causes a great trouble in production, such as low production capacity, high costs, and easy occurrence of poor welding and short circuit.

SUMMARY

An embodiment of the present disclosure is aimed to provide a rechargeable battery having an integrated cell. With this battery, the preceding problems in the existing art can be solved.

An embodiment of the present disclosure is aimed to provide an explosion-proof structure. With this structure, the preceding problems in the existing art can be solved.

An embodiment of the present disclosure is aimed to provide a cell assembly structure. With this structure, the preceding problems in the existing art can be solved.

An embodiment of the present disclosure is aimed to provide a safe and high-energy USB rechargeable battery. With this battery, the preceding problems in the existing art can be solved.

To achieve the preceding objects, the present disclosure employs the solutions described below.

A rechargeable battery having an integrated cell is provided. The rechargeable battery having an integrated cell includes a protective circuit board disposed at the top of the battery and a cell disposed at the base of the battery. The cell includes a jellyroll and a metal housing. The housing of the battery is made up of the metal housing. The protective circuit board is disposed on a protective board support structure. The cell is electrically connected to the protective circuit board through a socket disposed on the protective circuit board. A USB interface for charging the battery is disposed on the protective circuit board.

An explosion-proof structure is provided. The explosion-proof structure includes a metal housing for mounting a cell and an explosion-proof plug for sealing the cell in the metal housing. The explosion-proof plug is secured to the metal housing. The explosion-proof plug includes an explosion-proof plug body. The explosion-proof plug body has a pressure relief portion having a weaker strength than the explosion-proof plug body. One end of the pressure relief portion communicates with the interior of the metal housing and the other end of the pressure relief portion communicates with the exterior of the metal housing.

A USB rechargeable battery is provided. The USB rechargeable battery uses the preceding explosion-proof structure.

A cell assembly structure is provided. The cell assembly structure includes a positive electrode subassembly, a protective circuit board and a cell. The cell uses a rigid electrode pin. The protective circuit board is provided with a socket. The socket is provided with a socket hole that cooperates with the electrode pin. The electrode pin is in close cooperation with and electrically connected to the socket hole so that the cell is electrically connected to the socket. The positive electrode subassembly includes a positive electrode cap and a protective board support structure. The protective circuit board is disposed on the protective board support structure.

A safe and high-performance USB rechargeable battery is provided. The safe and high-performance USB rechargeable battery includes a metal housing, a positive electrode subassembly, a protective circuit board, a cell and an explosion-proof plug for sealing the cell in the metal housing The cell includes a jellyroll, a positive electrode pin, a negative electrode pin and a metal housing. The housing of the battery is made up of the metal housing.

The protective circuit board is disposed on a protective board support structure. The cell is electrically connected to the protective circuit board through a socket disposed on the protective circuit board. A USB interface for charging the battery is disposed on the protective circuit board.

The explosion-proof plug includes an explosion-proof plug body. The explosion-proof plug body has a pressure relief portion having a weaker strength than the explosion-proof plug body. One end of the pressure relief portion communicates with the interior of the metal housing and the other end of the pressure relief portion communicates with a pressure relief region.

BRIEF DESCRIPTION OF DRAWINGS

In FIGS. 1 to 5:

Figure 6:
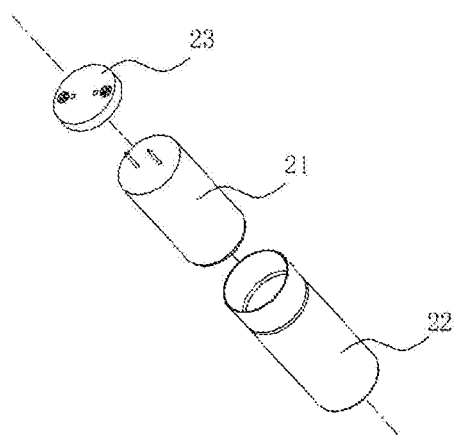
FIG. 6 is an exploded view of a cell, a metal housing and an explosion-proof plug according to embodiment two of the present disclosure.
Figure 7:
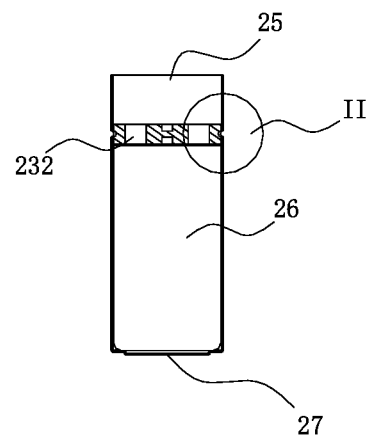
FIG. 7 is a sectional view of the cell, metal housing and explosion-proof plug that are assembled according to embodiment two of the present disclosure.
Figure 8:
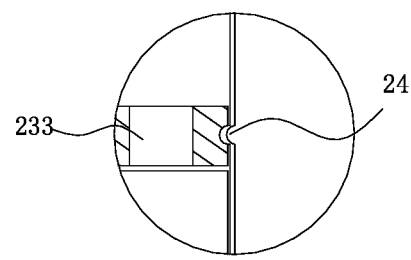
FIG. 8 is an enlarged view of region II of FIG. 7.
Figure 9:
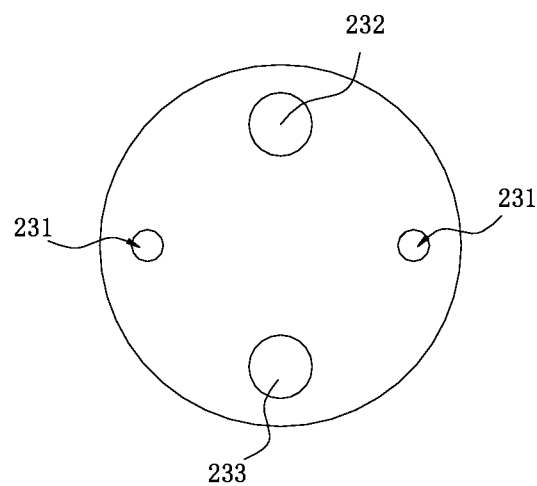
FIG. 9 is a structure view of the explosion-proof plug according to embodiment two of the present disclosure.
Figure 10:
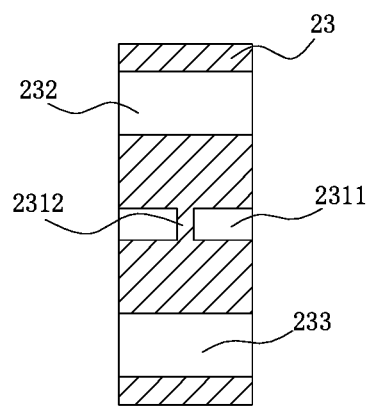
FIG. 10 is a sectional view of the explosion-proof plug according to embodiment two of the present disclosure.
Figure 11:
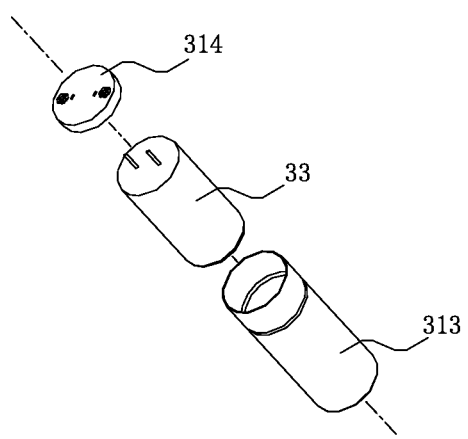
FIG. 11 is an exploded view of a cell, a metal housing and an explosion-proof plug according to embodiment three of the present disclosure.
Figure 12:
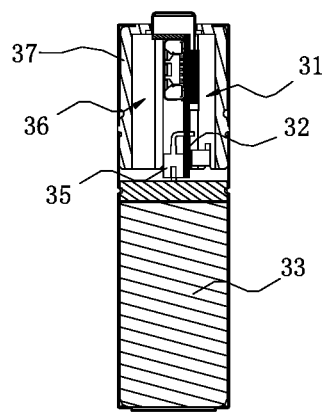
FIG. 12 is a sectional view illustrating a structure of a battery according to embodiment three of the present disclosure.
Figure 13:
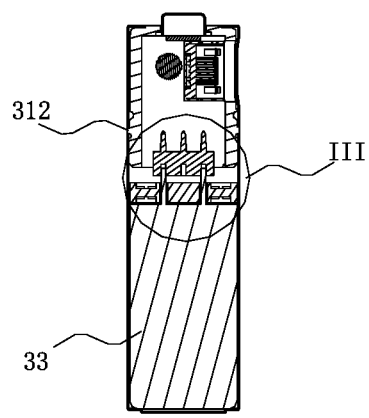
FIG. 13 is a sectional view illustrating the structure of the battery from another angle of view according to embodiment three of the present disclosure.
Figure 14:
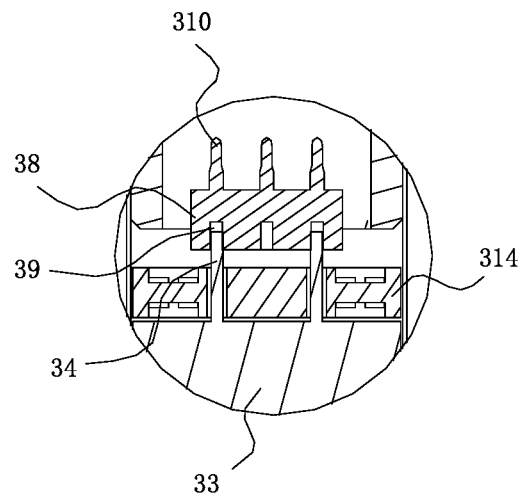
FIG. 14 is an enlarged view of region III of FIG. 13.
Figure 15:
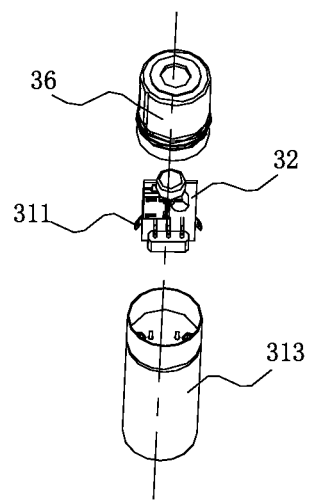
FIG. 15 is an exploded view of the battery according to embodiment three of the present disclosure.
Figure 16:
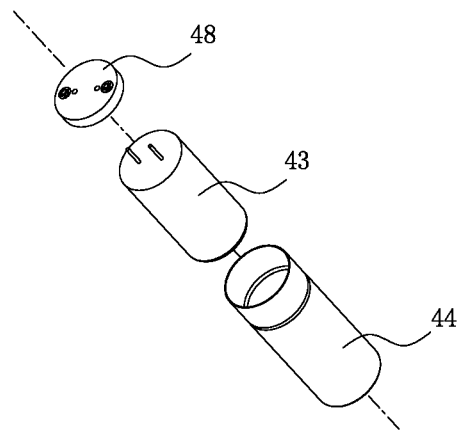
FIG. 16 is an exploded view of a cell, a metal housing and an explosion-proof plug according to embodiment four of the present disclosure.
Figure 17:
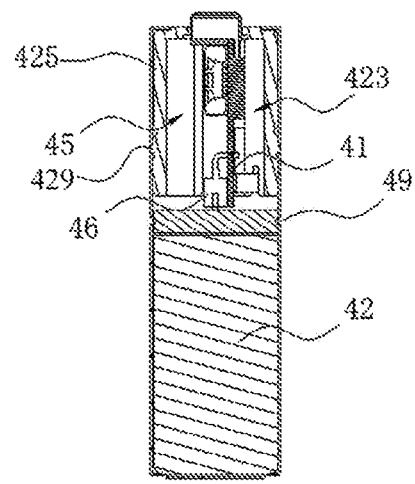
FIG. 17 is a sectional view illustrating a structure of a battery according to embodiment four of the present disclosure.
Figure 18:
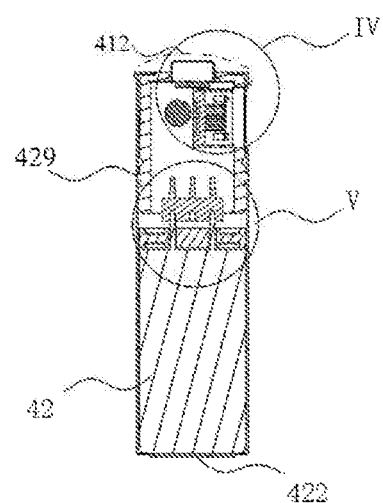
FIG. 18 is a sectional view illustrating the structure of the battery from another angle of view according to embodiment four of the present disclosure.
Figure 18A:
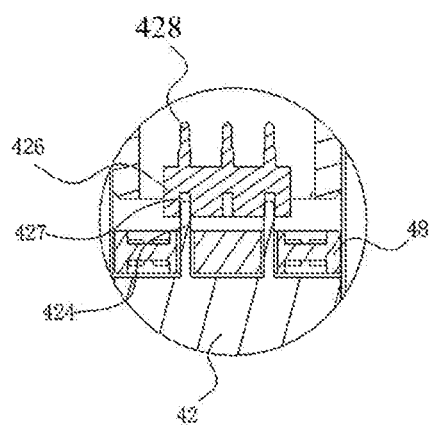
FIG. 18A is an enlarged view of region IV of FIG. 18.
Figure 18B:
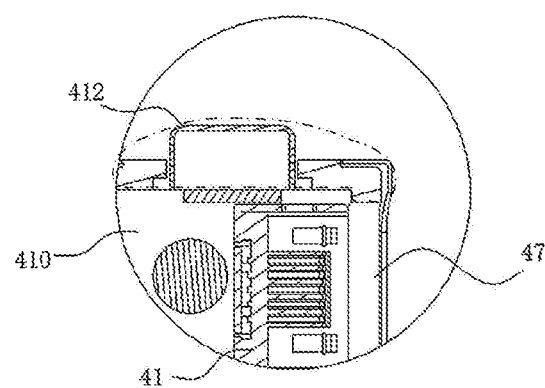
FIG. 18B is an enlarged view of region V of FIG. 18.
Figure 19:
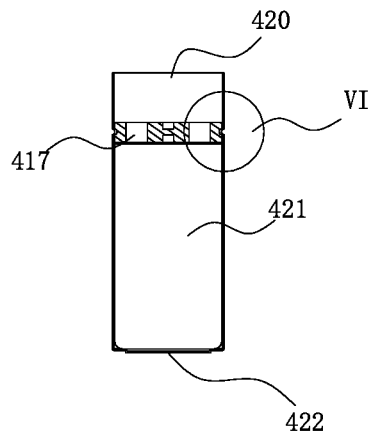
FIG. 19 is a sectional view of the cell, metal housing and explosion-proof plug that are assembled according to embodiment four of the present disclosure.
Figure 19A:
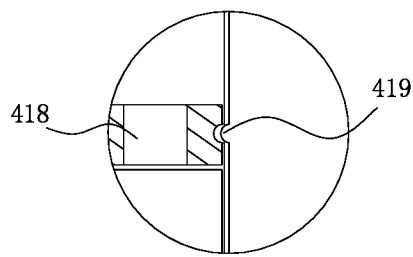
FIG. 19A is an enlarged view of region VI of FIG. 19.
Figure 20:
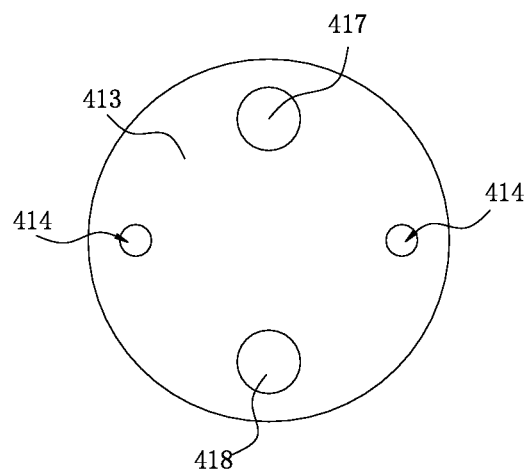
FIG. 20 is a structure view of the explosion-proof plug according to embodiment four of the present disclosure.
Figure 21:
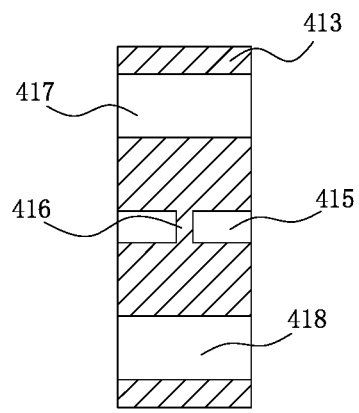
FIG. 21 is a sectional view of the explosion-proof plug according to embodiment four of the present disclosure.
Figure 22:
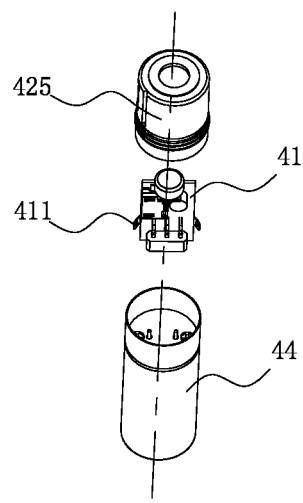
FIG. 22 is an exploded view of the battery according to embodiment four of the present disclosure.

11. protective circuit board, 12. cell, 121. jellyroll, 122. metal housing, 13. protective board support structure, 14.

socket, 15. USB interface, 16. explosion-proof plug, 17. groove, 18. pressure relief region, 19. negative ground lug, 110. positive electrode cap In FIGS. 6 to 10:

21. cell, 22. metal housing, 23. explosion-proof plug body, 231. pressure relief portion, 2311. pressure relief hole, 2312. pressure plug, 232. positive pinhole, 233. negative pinhole, 24. roll groove, 25. top mounting space, 26. base mounting space, 27. negative electrode platform In FIGS. 11 to 15:

31. positive electrode subassembly, 32. protective circuit board, 33. cell, 34. electrode pin, 35. socket, 36. protective board support structure, 37. support body, 38. socket body, 39. socket hole, 310. lead, 311. negative ground lug, 312. ring-shaped boss, 313. metal housing, 314. explosion-proof plug In FIGS. 16 to 22:

41. protective circuit board, 42. cell, 43. jellyroll, 44. metal housing, 45. protective board support structure, 46. socket, 47. USB interface, 48. explosion-proof plug, 49. groove, 410. pressure relief region, 411. negative ground lug, 412. positive electrode cap, 413. explosion-proof plug body, 414. pressure relief region, 415. pressure relief hole, 416. pressure plug, 417. positive pinhole, 418. negative pinhole, 419. roll groove, 420. top mounting space, 421. base mounting space, 422. negative electrode platform, 423. positive electrode subassembly, 424. electrode pin, 425. support body, 426. socket body, 427. socket hole, 428. lead, 429. ring-shaped boss

DETAILED DESCRIPTION

To make the solved problems, solutions employed and effects achieved in the present disclosure more clearly, the solutions provided in embodiments of the present disclosure will be described in further detail below with reference to the accompanying drawings. Apparently, the embodiments described below are merely part, not all, of embodiments of the present disclosure. Based on embodiments of the present disclosure, all other embodiments obtained by those skilled in the art on the premise that no creative work is done are within the scope of the present disclosure.

In the description of the present disclosure, unless otherwise expressly specified and limited, the term "connected to each other", "connected" or "fixed" is to be construed in a broad sense as permanently connected, detachably connected, or integrated; mechanically connected or electrically connected; directly connected to each other or indirectly connected to each other via an intermediary; or intra-connected between two components or interactional between two components. For those of ordinary skill in the art, the preceding terms can be construed according to specific circumstances in the present disclosure.

In the present disclosure, unless otherwise expressly specified and limited, that a first feature is "on" or "under" a second feature may include that the first feature is in direct contact with the second feature or may include that the first feature is not in direct contact with the second feature and is in contact with the second feature through another feature between them. In addition, that the first feature is "on", "above" or "over" the second feature includes that the first feature is right above or obliquely above the second feature or just indicates that the horizontal level of the first feature is higher than the horizontal level of the second feature. That the first feature is "under", "below" or "beneath" the second feature includes that the first feature is right below or obliquely below the second feature or just indicates that the horizontal level of the first feature is lower than the horizontal level of the second feature.

Embodiment One

Figure 1:
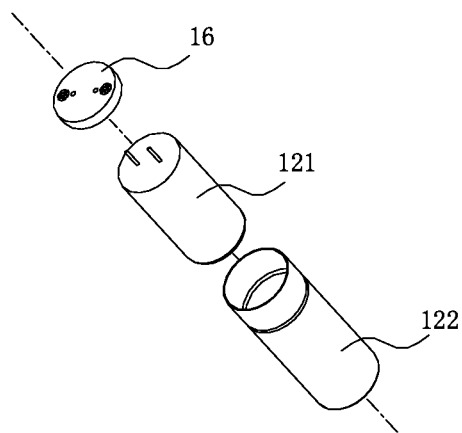
FIG. 1 is an exploded view of a cell, a metal housing and an explosion-proof plug according to embodiment one of the present disclosure.
Figure 2:
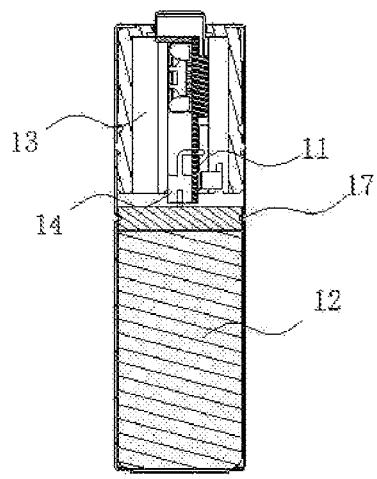
FIG. 2 is a sectional view illustrating a structure of a battery according to embodiment one of the present disclosure.
Figure 3:
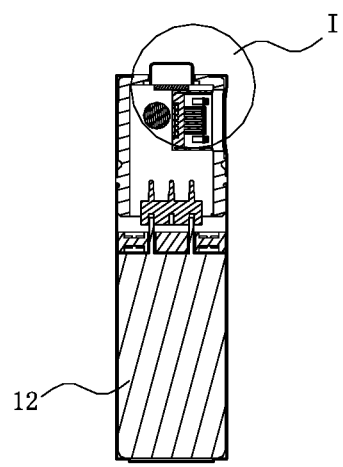
FIG. 3 is a sectional view illustrating the structure of the battery from another angle of view according to embodiment one of the present disclosure.
Figure 4:
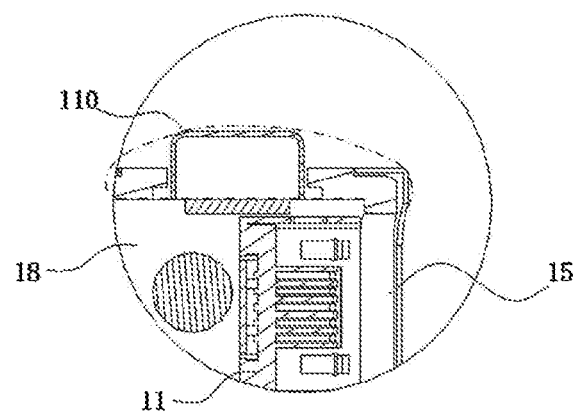
FIG. 4 is an enlarged view of region I of FIG. 3.
Figure 5:
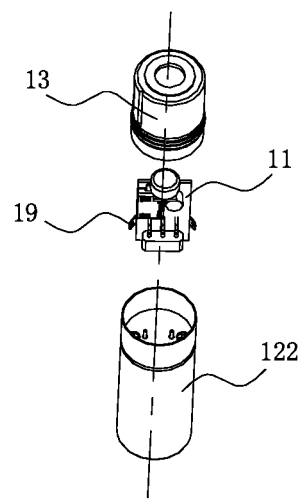
FIG. 5 is an exploded view of the battery according to embodiment one of the present disclosure.

As shown in FIGS. 1 to 5, in this embodiment, a rechargeable battery having an integrated cell according to the present disclosure includes a protective circuit board 11 disposed at the top of the battery and a cell 12 disposed at the base of the battery. The cell 12 includes a jellyroll 121 and a metal housing 122. The housing of the battery is made up of the metal housing 122. The protective circuit board 11 is disposed on a protective board support structure 13. The cell 12 is electrically connected to the protective circuit board 11 through a socket 14 disposed on the protective circuit board 11. A USB interface 15 for charging the battery is disposed on the protective circuit board 11.

In this solution, the integrated cell 12 is used, that is, the housing of the cell 12 is directly used as the housing of the battery, and no additional housing is added to the exterior of the battery, so that the assembled structure of the battery can be simplified and the mounting space can be reduced.

In this embodiment, since the cell 12 is integrated with the housing of the battery, the capacity of the battery 12 is increased by about 20% to 50%, and the material costs are greatly reduced. Meanwhile, the protective circuit board 11 at the upper end and the cell 12 are connected by a connector during assembly, so that the entire assembly flow can be simplified.

The metal housing 122 is a cylindrical structure with a closed end, and an open end of the metal housing 122 encapsulates the cell 12 through an explosion-proof plug 16.

Specifically, the explosion-proof plug 16 includes an explosion-proof plug 16 body. The explosion-proof plug 16 body is provided with a positive pinhole through which a positive electrode of the cell 12 is allowed to pass and a negative pinhole through which a negative electrode of the cell 12 is allowed to pass. The positive electrode and the negative electrode of the cell 12 are electrically connected to the protective circuit board 11 after passing through the positive pinhole and the negative pinhole respectively.

In this embodiment, the positive electrode and the negative electrode are rigid structures so that the positive electrode and the negative electrode can easily pass through the positive pinhole and the negative pinhole, and can be plugged into the socket 14. An interference fit is formed between the positive pinhole and the positive electrode. An interference fit is formed between the negative electrode and the negative electrode. The interference fit ensures that the electrolyte does not leak therefrom and ensures the sealing performance of the battery.

As a preferred solution, in this embodiment, the explosion-proof plug 16 is located in the metal housing 122 so that the protective circuit board 11 is partially located in the metal housing 122, the metal housing 122 is provided with a groove 17 at a position at which the explosion-proof plug 16 is disposed, the groove 17 is formed by concaving the metal housing 122, and the explosion-proof plug 16 is disposed at the groove and abuts against the inner wall of the groove 17 to seal up the cell 12. The structure of the housing of the cell 12 in this solution differs from the structure of a conventional cell. The cell 12 is mounted in such a manner that only part of the space is occupied in the battery. The rest space can be used for mounting the explosion-proof plug 16 and the protective circuit board 11.

The explosion-proof plug 16 includes the explosion-proof plug body. The explosion-proof plug body has a pressure relief portion having a weaker strength than the explosion-proof plug body. One end of the pressure relief portion is the interior of the metal housing 122 and the other end of the pressure relief portion is a pressure relief region 18. The pressure relief portion having a weaker strength than the explosion-proof plug body is disposed so that when the pressure exceeds a set pressure range, the pressure is released from the pressure relief portion and explosion of the battery caused by overlarge pressure is avoided.

To effectively implement pressure relief, under the condition that the pressure is released from the pressure relief portion, further pressure relief space is required. In this embodiment, the pressure relief region 18 is provided for pressure relief. Specifically, the pressure relief region 18 is the interior of a positive electrode cap 110 disposed over the protective circuit board 11. The interior of the positive electrode cap 110 has a space that is not filled by components, and thus the pressure inside the cell 12 is released into this space so that pressure relief is achieved.

Due to the limited space inside the positive electrode cap 110, in other embodiments as a further preferred solution, the pressure relief region 18 may be a battery exterior which is connected with the interior of the positive electrode cap through the USB interface. With this solution, the pressure inside the battery is released to the outside of the battery at a stroke, avoiding battery explosion more effectively.

The protective circuit board 11 is provided with a negative ground lug 19 abutting against the metal housing 122, and the negative ground lug 19 is made up of a metal dome. The groove 17 is a roll groove formed by rolling on the metal housing 122.

The protective board support structure includes a cylindrical support body. A through-hole for mounting the protective circuit board 11 is disposed inside the support body. One end of the protective circuit board 11 passing through the through-hole is connected to an electrode pin of the cell 12 and the other end of the protective circuit board 11 is connected to a positive electrode post.

The positive electrode cap 110 is disposed over the protective circuit board 11. The outer circumferential surface of the positive electrode cap 110 corresponds to the size of the outer circumferential surface of the metal housing 122. The positive electrode cap 110 is relatively insulated from the metal housing 122.

It is to be noted that the positive electrode cap 110 is not a necessary component of the present disclosure. In other embodiments, a protective board support structure may be used as the top housing of the rechargeable battery. The size of the top housing corresponds to the size of the metal housing such that a desired battery model is formed.

Embodiment Two

As shown in FIGS. 6 to 10, in this embodiment, an explosion-proof structure according to the present disclosure includes a metal housing 22 for mounting a cell 21 and an explosion-proof plug for sealing the cell 21 in the metal housing 22. The explosion-proof plug is fixedly connected to the metal housing 22. The explosion-proof plug includes an explosion-proof plug body 23. The explosion-proof plug body 23 has a pressure relief portion 231 having a weaker strength than the explosion-proof plug body 23. One end of the pressure relief portion 231 communicates with the interior of the metal housing 22 and the other end of the pressure relief portion 231 communicates with the exterior of the metal housing 22.

In this embodiment, the pressure relief portion 231 having a weaker strength than the explosion-proof plug body 23 is provided. When the internal pressure is too high, the pressure relief portion 231 is first damaged by the pressure. The pressure is released from the pressure relief portion 231. In this way, explosion is avoided.

The key of this solution is that the strength of the pressure relief portion 231 is weaker than the strength of the metal housing 22 and the strength of the position at which the metal housing 22 is connected to the explosion-proof plug body 23. That is, when the pressure is too high, the pressure relief portion 231 can be damaged prior to other positions. The directional release of the pressure in this way makes the release of the pressure controllable, effectively avoiding explosion and preventing an accident.

Specifically, in this embodiment, the explosion-proof plug body 23 is provided with a positive pinhole 232 through which the positive electrode of the cell 21 is allowed to pass and a negative pinhole 233 through which the negative electrode of the cell 21 is allowed to pass, and the pressure relief portion 231 is disposed along the length direction of the positive pinhole 232 and the negative pinhole 233.

The positive pinhole 232 and the negative pinhole 233 are provided along the thickness direction of the explosion-proof plug body 23. The peripheral portion of the explosion-proof plug body 23 abuts against the inner wall of the metal housing 22.

The strength of the pressure relief portion 231 is configured to be weaker than that of the explosion-proof plug body 23 in various manners. In this embodiment, the pressure relief portion 231 is a non-through-hole structure disposed on the explosion-proof plug body 23. Specifically, in this embodiment, the pressure relief portion 231 includes a pressure relief hole 2311 disposed on the explosion-proof plug body 23 and a pressure plug 2312 disposed in the pressure relief hole 2311, and the pressure plug 2312 is integrally formed with the explosion-proof plug body 23.

In this embodiment, the pressure plug 2312 and the explosion-proof plug body 23 are integrally formed. That is, a counter bore structure is formed on the explosion-proof plug body 23. The bottom of the counter bore is used as the pressure relief portion 231. The thickness of the bottom of the counter bore determines the range of pressure the pressure relief portion 231 can withstand.

In this embodiment, the non-through-hole structure is injection molded together with the explosion-proof plug while the explosion-proof plug is being processed. In other embodiments, the non-through-hole structure may be formed by cutting part of material from the explosion-proof plug body 23.

In this embodiment, the explosion-proof plug body 23 is made up of rubber or other elastic material, and the pressure relief portion 231 is also made up of rubber or other elastic material. In other embodiments, the explosion-proof plug body 23 may still be made up of rubber or other elastic material while the pressure relief portion 231 may be made up of metal.

For example, in a preferred embodiment, the pressure relief portion 231 includes a pressure relief hole 2311 disposed on the explosion-proof plug body 23 and a pressure plug 2312 disposed in the pressure relief hole 2311, the pressure plug 2312 is disposed separate from the explosion-proof plug body 23, and an interference fit is formed between the pressure plug 2312 and the pressure relief hole 2311. With this interference fit, the pressure is controlled by the magnitude of the friction between the pressure relief hole 2311 and the pressure plug 2312. When the internal pressure exceeds the magnitude of the friction, the pressure plug 2312 is gradually extruded from the pressure relief hole 2311 to release the internal pressure.

In this embodiment, the metal housing 22 is a circular structure, and the shape of the explosion-proof plug corresponds to the shape of the metal housing 22. Two pressure relief holes 2311 are disposed on the explosion-proof plug, and the pressure relief holes 2311 in this embodiment are circular in shape.

The number and the shape of the pressure relief holes 2311 are not limited to the form described in this embodiment. In other embodiments, one pressure relief hole or more than two pressure relief holes 2311 may be provided, and each pressure relief hole 2311 may be a rectangular or polygonal structure.

A roll groove 24 is disposed along the periphery of the metal housing 22. The roll groove 24 is formed by concaving the metal housing 22. The explosion-proof plug is disposed at the roll groove 24 and abuts against the inner wall of the roll groove 24 to seal up the cell 21.

The roll groove 24 abuts against the explosion-proof plug to fully clamp the explosion-proof plug, thereby ensuring that the position of the explosion-proof plug body 23 does not change under the effect of the internal pressure and thus the pressure relief portion 231 acts to protect the battery from damage. In this solution, the interaction force between the explosion-proof plug and the metal housing 22 is greater than the ultimate pressure the pressure relief portion 231 can withstand, so that the position of the explosion-proof plug can remain unchanged when the pressure relief portion 231 is damaged under the pressure.

Meanwhile, in this embodiment, a USB rechargeable battery which employs the preceding explosion-proof structure is provided. The metal housing 22 has a base mounting space 26 for mounting the cell 21 and a top mounting space 25 for mounting a USB charging device. The explosion-proof plug is disposed between the base mounting space 26 and the top mounting space 25. A negative electrode platform 27 is disposed at an end of the metal housing far from the top mounting space 25.

Embodiment Three

As shown in FIGS. 11 to 15, in this embodiment, a cell assembly structure according to the present disclosure includes a positive electrode assembly 31, a protective circuit board 32 and a cell 33. The cell 33 uses a rigid electrode pin 34. The protective circuit board 32 is provided with a socket 35. The socket 35 is provided with a socket hole 39 that cooperates with the electrode pin 34. The electrode pin 34 is in close cooperation with and electrically connected to the socket hole 39 so that the cell 33 is electrically connected to the socket 35. The positive electrode assembly 31 includes a positive electrode cap and a protective board support structure 36. The protective circuit board 32 is disposed on the protective board support structure 36.

With the preceding structure, after the production test of the protective circuit board 32 is completed, the assembly process is completed simply when the protective circuit board 32 is inserted directly into the cell 33. The simple assembly process facilitates production automation and ensures the reliability of the product. This solution solves the problem in connection between the cell 33 and the protective circuit board 32 and the metal housing, and effectively reduces the product costs and the potential unsafety caused by manual welding.

To improve the stability of the protective circuit board 32, in this embodiment, the protective board support structure 36 is provided to support the protective circuit board 32. The connection and the relative position relationship between the protective board support structure 36 and the protective circuit board 32 may be in a variety of forms. In this embodiment, the protective board support structure 36 is detachably connected to the protective board support structure 32.

Specifically, in this embodiment, the protective board support structure 36 includes a cylindrical support body 37, a through-hole for mounting the protective circuit board 32 is disposed inside the support body 37, and one end of the protective circuit board 32 passing through the through-hole is connected to an electrode pin 34 of the cell 33 and the other end of the protective circuit board 32 is connected to a positive electrode post.

In this embodiment, a metal housing 313 and the negative electrode of the cell 33 are connected to form the negative electrode of the battery, a positive electrode post is disposed on the protective circuit board 32, and the positive electrode post and the positive electrode of the cell 33 are electrically connected to form the positive electrode of the battery, for example, the positive electrode post and the positive electrode of the cell 33 are electrically connected via the protective circuit board 32. The positive electrode post on the protective circuit board 32 passes through the through-hole on the support body 37 and extends out of the support body 37. The socket 35 includes a socket body 38. The socket hole 39 is disposed at an end of the socket body 38 facing towards the cell 33. A lead 310 is disposed at an end of the socket body 38 far from the socket hole 39. The electrode pin 34 closely cooperates with the socket hole 39 and then is electrically connected to the protective circuit board 32 through the lead 310.

In this embodiment, the socket 35 is disposed on the protective circuit board 32 so that the positive electrode and the negative electrode of the cell 33 can be electrically connected to the protective circuit board 32 by being plugged into the socket 35, thereby improving the working efficiency more effectively, better ensuring a better qualification rate of the product and effectively reducing the production costs than the weld structure.

The protective circuit board 32 is provided with a negative ground lug 311. The negative ground lug 311 is made up of a metal dome. The negative ground lug 311 has a first end of the ground lug electrically connected to the protective circuit board 32 and a second end of the ground lug far from the protective circuit board 32. The second end of the ground lug abuts against the metal housing 313 under the condition that the protective circuit board 32 is mounted in the metal housing 313.

In this solution, the negative ground lug 311 made up of the metal dome is configured to abut against the metal housing 313 to achieve grounding so that the contact resistance can be effectively reduced and the contact reliability can be ensured.

Specifically, in this embodiment, a ring-shaped boss 312 is disposed outside the support body 37, and the ring-shaped boss 312 is disposed between the positive electrode cap and the metal housing 313 in an assembled state to insulate the positive electrode cap from the metal housing 313.

In this embodiment, the metal housing 313 is disposed for mounting the cell 33. The metal housing 313 is a cylindrical structure with a closed end. The open end of the metal housing encapsulates the cell through an explosion-proof plug 314. The explosion-proof plug 314 is secured to the metal housing 313. The explosion-proof plug 314 includes an explosion-proof plug body. The explosion-proof plug body has a pressure relief portion having a weaker strength than the explosion-proof plug body. One end of the pressure relief portion communicates with the interior of the metal housing 313 and the other end of the pressure relief portion communicates with the exterior of the metal housing 313.

In other embodiments, the positive electrode cap is integrally formed with the protective board support structure 36 by injection molding.

In other embodiments of the present disclosure, a cell assembly structure is provided. The cell assembly structure includes a positive electrode assembly, a protective circuit board and a cell. The cell uses a rigid electrode pin. The positive electrode assembly includes a positive electrode cap and a protective board support structure. The protective circuit board is disposed on the protective board support structure. The electrode pin is electrically connected to the protective circuit board by welding.

Meanwhile, in this embodiment, a USB rechargeable battery is provided. The cell 33 of this USB rechargeable battery is assembled by using the preceding cell assembly structure.

Embodiment Four

As shown in FIGS. 16 to 22, in this embodiment of the present disclosure, a safe and high performance USB rechargeable battery includes a metal housing 44, a positive electrode assembly 423, a protective circuit board 41, a cell 42 and an explosion-proof plug 48 for sealing the cell 42 in the metal housing 44.

The cell 42 includes a jellyroll 43, a positive electrode pin 424, a negative electrode pin 424 and a metal housing 44. The housing of the battery is made up of the metal housing 44. In this solution, the integrated cell 42 is used. That is, the housing of the cell 42 is used as the housing of the battery and no additional housing is added to the exterior of the battery. In this way, the assembly structure of the battery can be simplified and the mounting space can be reduced.

In this embodiment, the cell 42 is integrated with the housing of the battery so that the cell 42 can be increased by about 20% to 50% in capacity and the material costs are greatly reduced. Meanwhile, the protective circuit board 41 at the upper end of the battery and the cell 42 are connected by a connector so that the entire assembly flow is simplified.

The protective circuit board 41 is disposed on a protective board support structure 45. The cell 42 is electrically connected to the protective circuit board 41 through a socket 46 disposed on the protective circuit board 41. A USB interface 47 for charging the battery is disposed on the protective circuit board 41. With the connection by the socket 46, after the production test of the protective circuit board 41 is completed, the assembly is completed simply when the protective circuit board 42 is inserted directly into the cell 42. The simple assembly process facilitates production automation and ensures the reliability of the product. This solution solves the problem in connection between the cell 42 and the protective circuit board 41 and the metal housing, and effectively reduces the product costs and the potential unsafety caused by manual welding. The USB battery provided in this solution has better usage performance.

The explosion-proof plug 48 includes an explosion-proof plug body 413. The explosion-proof plug body 413 has a pressure relief portion 414 having a weaker strength than the explosion-proof plug body 413. One end of the pressure relief portion 414 communicates with the interior of the metal housing 44 and the other end of the pressure relief portion communicates with a pressure relief region 410. As the pressure relief portion 414 having a weaker strength than the explosion-proof plug body 413 is provided when the internal pressure is too high, the pressure relief portion 414 is first damaged by the pressure. The pressure is released from the pressure relief portion 414 to avoiding the explosion of the battery.

The metal housing 44 is a cylindrical structure with a closed end. The open end of the metal housing encapsulates the cell 42 through the explosion-proof plug 48. The explosion-proof plug 48 includes an explosion-proof plug body 413. The explosion-proof plug body 413 is provided with a positive pinhole 417 through which a positive electrode pin 424 of the cell 42 is allowed to pass and a negative pinhole 418 through which a negative electrode pin 424 of the cell 42 is allowed to pass. The positive electrode pin 424 and the negative electrode pin 424 of the cell 42 are electrically connected to the protective circuit board 41 after passing through the positive pinhole 417 and the negative pinhole 418 respectively. The pressure relief portion 414 is disposed along the length direction of the positive pinhole 417 and the negative pinhole 418.

In this embodiment, the metal housing 44 is a circular structure, and the shape of the explosion-proof plug 48 corresponds to the shape of the metal housing 44. In other embodiments, the metal housing 44 may have other shapes, and it is all right as along as the explosion-proof plug 48 corresponds to the shape of the metal housing 44 to ensure the sealing performance of the battery.

Specifically, the metal housing 44 has a base mounting space 421 for mounting the cell 42 and a top mounting space 420 for mounting a USB charging device, and the explosion-proof plug 48 is disposed between the base mounting space 421 and the top mounting space 420, and located inside the metal housing 44 so that the protective circuit board 41 is partially inside the metal housing 44. The metal housing 44 is provided with a groove 49 at a position at which the explosion-proof plug 48 is disposed. The groove 49 is formed by concaving the metal housing 44. The explosion-proof plug 48 is disposed at the groove 49 and abuts against the inner wall of the groove 49 to seal up the cell 42. The groove 49 is a roll groove 419 formed by rolling on the metal housing 44.

The explosion-proof plug body 413 has a pressure relief portion 414 having a weaker strength than the explosion-proof plug body 413. One end of the pressure relief portion 414 communicates with the interior of the metal housing 44 and the other end of the pressure relief portion communicates with a pressure relief region 410.

Specifically, the pressure relief portion 414 is a non-through-hole structure disposed on the explosion-proof plug body 413.

The pressure relief portion 414 includes a pressure relief hole 415 disposed on the explosion-proof plug body 413 and a pressure plug 416 disposed in the pressure relief hole 415.

In this embodiment, the pressure plug 416 and the explosion-proof plug body 413 are integrally formed. That is, a counter bore structure is formed on the explosion-proof plug body 413. The bottom of the counter bore is used as the pressure relief portion 414. The thickness of the bottom of the counter bore determines the range of pressure the pressure relief portion 414 can withstand.

In this embodiment, the non-through-hole structure is injection molded together with the explosion-proof plug 48 while the explosion-proof plug 48 is being processed. In other embodiments, the non-through-hole structure may be formed by cutting part of material from the explosion-proof plug body 413.

In this embodiment, the explosion-proof plug body 413 is made up of rubber or other elastic material, and the pressure relief portion 414 is also made up of rubber or other elastic material.

In other embodiments, the explosion-proof plug body 413 may still be made up of rubber or other elastic material while the pressure relief portion 414 may be made up of metal.

For example, in a preferred embodiment, the pressure relief portion 414 includes a pressure relief hole 415 disposed on the explosion-proof plug body 413 and a pressure plug 416 disposed in the pressure relief hole 415, the pressure plug 416 is disposed separate from the explosion-proof plug body 413, and an interference fit is formed between the pressure plug 416 and the pressure relief hole 415. With this interference fit, the pressure is controlled by the magnitude of the friction between the pressure relief hole 415 and the pressure plug 416. When the internal pressure exceeds the magnitude of the friction, the pressure plug 416 is gradually extruded from the pressure relief hole 415 to release the internal pressure.

In a preferred solution, the socket 46 is provided with a socket hole 427 that cooperates with the positive electrode pin 424 and the negative electrode pin 424, the positive electrode pin 424 and the negative electrode pin 424 are in close cooperation with and electrically connected to the socket hole 427 so that the cell 42 is electrically connected to the socket 46, the positive electrode assembly 423 includes a positive electrode cap 412 and a protective board support structure, and the protective circuit board 41 is disposed on the protective board support structure.

The positive electrode cap 412 is disposed over the protective circuit board 41. The outer circumferential surface of the positive electrode cap 412 corresponds to the size of the outer circumferential surface of the metal housing 44. The positive electrode cap 412 is relatively insulated from the metal housing 44. A ring-shaped boss 429 is disposed outside the support body 425, and the ring-shaped boss 429 is disposed between the positive electrode cap 412 and the metal housing 44 in an assembled state to insulate the positive electrode cap 412 from the metal housing 44. The positive electrode cap 412 is integrally formed with the protective board support structure by injection molding.

To improve the stability of the protective circuit board 41, in this embodiment, the protective board support structure is provided to support the protective circuit board 41. The connection and the relative position relationship between the protective board support structure and the protective circuit board 41 may be in a variety of forms. In this embodiment, the protective board support structure is detachably connected to the protective board support structure 41.

The connection between the protective board support structure and the protective circuit board 41 is not limited to the form described in this embodiment. In other embodiments, the positive electrode pin 424 and the negative electrode pin 424 may also be electrically connected to the protective circuit board 41 by welding.

Specifically, in this embodiment, the protective board support structure includes a cylindrical support body 425, a through-hole 41 for mounting the protective circuit board 41 is disposed inside the support body 425, and one end of the protective circuit board 41 passing through the through-hole is connected to an electrode pin 424 of the cell 42 and the other end of the protective circuit board 41 is connected to a positive electrode post.

In this embodiment, the metal housing 44 and the negative electrode of the cell 42 are connected to form the negative electrode of the battery, a positive electrode post is disposed on the protective circuit board 41, and the positive electrode post and the positive electrode of the cell 42 are electrically connected to form the positive electrode of the battery, for example, the positive electrode post and the positive electrode of the cell 42 are electrically connected via the protective circuit board 41. The positive electrode post on the protective circuit board 41 passes through the through-hole on the support body 425 and extends out of the support body 425. A negative electrode platform 422 is disposed at an end of the metal housing far from the top mounting space 420.

The socket 46 includes a socket body 426. The socket hole 427 is disposed at an end of the socket body 426 facing towards the cell 42. A lead 428 is disposed at an end of the socket body 426 far from the socket hole 427. The electrode pin 424 closely cooperates with the socket hole 427 and then is electrically connected to the protective circuit board 41 through the lead 428. The term "lead" referred to herein may include a connection line or a pin.

The pressure relief region 410 is the interior of a positive electrode cap 412 disposed over the protective circuit board 41 or the pressure relief region 410 is a battery exterior communicating with the interior of the positive electrode cap 412 through the USB interface. To effectively implement pressure relief, under the condition that the pressure is released from the pressure relief portion 414, further pressure relief space is required. In this embodiment, the pressure relief region 410 is provided for pressure relief. Specifically, the pressure relief region 410 is the interior of a positive electrode cap 412 disposed over the protective circuit board 41. The interior of the positive electrode cap 412 has a space that is not filled by components, and thus the pressure inside the cell 42 is released into this space so that pressure relief is achieved.

Due to the limited space inside the positive electrode cap 412, in other embodiments as a further preferred solution, the pressure relief region 410 may be a battery exterior communicating with the interior of the positive electrode cap 412 through the USB interface 47. With this solution, the pressure inside the battery is released to the outside of the battery at a stroke, avoiding battery explosion more effectively.

The protective circuit board 41 is provided with a negative ground lug 411. The negative ground lug 411 is made up of a metal dome. The negative ground lug 411 has a first end of the ground lug electrically connected to the protective circuit board 41 and a second end of the ground lug far from the protective circuit board 41. The second end of the ground lug abuts against the metal housing 44 under the condition that the protective circuit board 41 is mounted in the metal housing 44.

In this solution, the negative ground lug 411 made up of the metal dome is configured to abut against the metal housing 44 to achieve grounding so that the contact resistance can be effectively reduced and the contact reliability can be ensured.

In the description of the present disclosure, it is to be understood that the orientation or the position relationships indicated by terms "above", "below", "right" and the like are based on the orientation or position relationships shown in the accompanying drawings, merely for facilitating description and simplifying operation, and do not indicate or imply that the device or element that is referred to must have a specific orientation or must be constructed and operated in a specific orientation, and thus cannot be construed as limiting the present disclosure. The terms "first" and "second" are only used for descriptive purposes and have no special meanings.

In a description of this specification, the description of reference terms "an embodiment" and "example" is intended to be included in at least one of embodiments or examples of the present disclosure in connection with specific characteristics, structures, materials or features described in this embodiment or example. In the specification, the illustrative description of the preceding terms does not necessarily refer to the same embodiment or example.

Moreover, it is to be understood that although this specification is described in terms of the embodiments, not every embodiment includes only one independent solution. Such description mode of the specification is merely for the sake of clarity, and those skilled in the art should regard the specification as a whole. The technical solutions in the embodiments may also be appropriately combined to form other embodiments that can be understood by those skilled in the art.

The principle of the present disclosure is described above in conjunction with the embodiments. The description is merely intended to explain the principle of the present disclosure, and should not be construed, in any way, as limiting the scope of present disclosure. Based on such explanation, other embodiments of the present disclosure obtained by those skilled in the art are within the scope of the present disclosure on the premise that no creative work is done.

What is claimed is:

1. A rechargeable battery having a cell, comprising:
a protective circuit board disposed on a protective board support structure and at a top of the rechargeable battery, wherein the protective circuit board comprises a USB interface for charging the rechargeable battery and a socket; and
a cell disposed at a base of the rechargeable battery and comprising a jellyroll and a metal housing which is a cylindrical structure with a closed end and an open end, wherein the metal housing is used as a housing of the rechargeable battery, and the cell is electrically connected to the protective circuit board through the socket;
an explosion-proof plug disposed inside the metal housing to divide the metal housing into a first region with the closed end and a second region with the open end, the first region is used for mounting the cell and is sealed by the explosion-proof plug, the second region is used for mounting the protective circuit board and the open end of the second region is sealed by a positive electrode cap;
wherein the explosion-proof plug comprises an explosion-proof plug body, the explosion-proof plug body is provided with a positive pinhole through which a positive electrode of the cell is allowed to pass and a negative pinhole through which a negative electrode of the cell is allowed to pass, and the positive electrode and the negative electrode of the cell are electrically connected to the protective circuit board after passing through the positive pinhole and the negative pinhole respectively;
wherein the metal housing is provided with a groove at a position at which the explosion-proof plug is disposed, the groove is formed by concaving the metal housing, and the explosion-proof plug is disposed at the groove and abuts against an inner wall of the groove to seal up the cell; and
wherein in the second region, the protective circuit board is vertically inserted into the explosion-proof plug, the protective circuit board and the USB interface are integrally formed, and the positive electrode cap is disposed over the protective circuit board; the second region is a pressure relief region which comprises an interior of the positive electrode cap, an interior of the USB interface, and a path between the interior of the positive electrode cap and the interior of the USB interface, so that a pressure inside the rechargeable battery is released to the outside of the rechargeable battery through the interiors and the path.

2. The rechargeable battery according to claim 1, wherein the protective circuit board is provided with a negative ground lug abutting against the metal housing, and the negative ground lug is made up of a metal dome.

3. The rechargeable battery according to claim 1, wherein the groove is a roll groove formed by rolling on the metal housing.

4. The rechargeable battery according to claim 3, wherein the protective board support structure comprises a cylindrical support body, a through-hole for mounting the protective circuit board is disposed inside the cylindrical support body, and one end of the protective circuit board passing through the through-hole is connected to an electrode pin of the cell and another end of the protective circuit board is connected to a positive electrode post.

5. The rechargeable battery according to claim 1, wherein an outer circumferential surface of the positive electrode cap corresponds to a size of an outer circumferential surface of the metal housing, and the positive electrode cap is relatively insulated from the metal housing.

6. An explosion-proof structure, comprising:
a metal housing which is a cylindrical structure with a closed end and an open end and for mounting a cell; and
an explosion-proof plug disposed inside the metal housing to divide the metal housing into a first region with the closed end and a second region with the open end, the first region is used for mounting the cell and is sealed by the explosion-proof plug, the second region is used for mounting the protective circuit board and the open end of the second region is sealed by a positive electrode cap,
wherein the explosion-proof plug comprises an explosion-proof plug body, the explosion-proof plug body has a pressure relief portion having a weaker strength than the explosion-proof plug body, and one end of the pressure relief portion communicates with an interior of the metal housing and another end of the pressure relief portion communicates with an exterior of the metal housing;
wherein the explosion-proof plug body is provided with a positive pinhole through which a positive electrode of the cell is allowed to pass and a negative pinhole through which a negative electrode of the cell is allowed to pass, and the positive electrode and the negative electrode of the cell are electrically connected to the protective circuit board after passing through the positive pinhole and the negative pinhole respectively;
wherein the metal housing is provided with a groove at a position at which the explosion-proof plug is disposed, the groove is formed by concaving the metal housing, and the explosion-proof plug is disposed at the groove and abuts against an inner wall of the groove to seal up the cell; and wherein in the second region, the protective circuit board is vertically inserted into the explosion-proof plug, the protective circuit board and the USB interface are integrally formed, and the positive electrode cap is disposed over the protective circuit board; the second region is a pressure relief region which comprises an interior of the positive electrode cap, an interior of the USB interface, and a path between the interior of the positive electrode cap and the interior of the USB interface, so that a pressure inside the rechargeable battery is released to the outside of the rechargeable battery through the interiors and the path.

7. The explosion-proof structure according to claim 6, wherein the pressure relief portion is a non-through-hole structure disposed on the explosion-proof plug body.

8. The explosion-proof structure according to claim 7, wherein the pressure relief portion comprises a pressure relief hole disposed on the explosion-proof plug body and a pressure plug disposed in the pressure relief hole, and the pressure plug is integrally formed with the explosion-proof plug body.

9. The explosion-proof structure according to claim 7, wherein the pressure relief portion comprises a pressure relief hole disposed on the explosion-proof plug body and a pressure plug disposed in the pressure relief hole, the pressure plug is disposed separate from the explosion-proof plug body, and an interference fit is formed between the pressure plug and the pressure relief hole.

10. The explosion-proof structure according claim 6, wherein a shape of the metal housing is circular or rectangular, and a shape of the explosion-proof plug corresponds to the shape of the metal housing.

11. A USB rechargeable battery, using the explosion-proof structure according to claim 6.

12. The USB rechargeable battery according to claim 11, wherein the metal housing has a base mounting space for mounting the cell and a top mounting space for mounting a USB charging device, and the explosion-proof plug is disposed between the base mounting space and the top mounting space.

13. The USB rechargeable battery according to claim 12, wherein a negative electrode platform is disposed at an end of the metal housing far from the top mounting space.

14. A cell assembly structure, comprising:
a positive electrode assembly comprising a positive electrode cap and a protective board support structure;
a protective circuit board which is provided with a socket and is disposed on the protective board support structure; and
a cell which uses a rigid electrode pin and comprises a positive electrode and a negative electrode; and
a metal housing, wherein the metal housing is a cylindrical structure with a closed end and an open end and is used for mounting the cell,
an explosion-proof plug disposed inside the metal housing to divide the metal housing into a first region with the closed end and a second region with the open end, the first region is used for mounting the cell and is sealed by the explosion-proof plug, the second region is used for mounting the protective circuit board and the open end of the second region is sealed by a positive electrode cap
wherein the socket is provided with a socket hole that cooperates with the electrode pin, the electrode pin is in close cooperation with and electrically connected to the socket hole so that the cell is electrically connected to the socket;

wherein the explosion-proof plug comprises an explosion-proof plug body, the explosion-proof plug body is provided with a positive pinhole through which the positive electrode is allowed to pass and a negative pinhole through which the negative electrode is allowed to pass, and the positive electrode and the negative electrode of the cell are electrically connected to the protective circuit board after passing through the positive pinhole and the negative pinhole respectively;

wherein the metal housing is provided with a groove at a position at which the explosion-proof plug is disposed, the groove is formed by concaving the metal housing, and the explosion-proof plug is disposed at the groove and abuts against an inner wall of the groove to seal up the cell; and wherein in the second region, the protective circuit board is vertically inserted into the explosion-proof plug, the protective circuit board and the USB interface are integrally formed, and the positive electrode cap is disposed over the protective circuit board; the second region is a pressure relief region which comprises an interior of the positive electrode cap, an interior of the USB interface, and a path between the interior of the positive electrode cap and the interior of the USB interface, so that a pressure inside the rechargeable battery is released to the outside of the rechargeable battery through the interiors and the path.

15. The cell assembly structure according to claim 14, wherein the protective board support structure is detachably connected to the protective circuit board, the protective board support structure comprises a cylindrical support body, a through-hole for mounting the protective circuit board is disposed inside the support body, and one end of the protective circuit board passing through the through-hole is connected to an electrode pin of the cell and another end of the protective circuit board is connected to a positive electrode post.

16. The cell assembly structure according to claim 15, wherein the socket comprises a socket body, the socket hole is disposed at an end of the socket body facing towards the cell, a lead is disposed at an end of the socket body far from the socket hole, and the electrode pin closely cooperates with the socket hole and is electrically connected to the protective circuit board through the lead.

17. The cell assembly structure according to claim 15, wherein the protective circuit board is provided with a negative ground lug, the negative ground lug is made up of a metal dome, the negative ground lug has a first end of the ground lug electrically connected to the protective circuit board and a second end of the ground lug far from the protective circuit board, and the second end of the ground lug abuts against the metal housing under the condition that the protective circuit board is mounted in the metal housing.

18. The cell assembly structure according to claim 15, wherein a ring-shaped boss is disposed outside the support body, and the ring-shaped boss is between the positive electrode cap and the metal housing in an assembled state to insulate the positive electrode cap from the metal housing.

19. The cell assembly structure according to claim 14, wherein the positive electrode cap is integrally formed with the protective board support structure by injection molding.

20. A cell assembly structure, comprising:
a positive electrode assembly comprising a positive electrode cap and a protective board support structure, a protective circuit board which is disposed on the protective board support structure; and a cell, wherein the cell comprises a positive electrode and a negative electrode and the cell uses a rigid electrode pin which is electrically connected to the protective circuit board by a plugging procedure; and a metal housing, wherein the metal housing is a cylindrical structure with a closed end and an open end and is used for mounting the cell;

an explosion-proof plug disposed inside the metal housing to divide the metal housing into a first region with the closed end and a second region with the open end, the first region is used for mounting the cell and is sealed by the explosion-proof plug, the second region is used for mounting the protective circuit board and the open end of the second region is sealed by a positive electrode cap;

wherein the explosion-proof plug comprises an explosion-proof plug body, the explosion-proof plug body is provided with a positive pinhole through which the positive electrode is allowed to pass and a negative pinhole through which the negative electrode is allowed to pass, and the positive electrode and the negative electrode of the cell are electrically connected to the protective circuit board after passing through the positive pinhole and the negative pinhole respectively;

wherein the metal housing is provided with a groove at a position at which the explosion-proof plug is disposed, the groove is formed by concaving the metal housing, and the explosion-proof plug is disposed at the groove and abuts against an inner wall of the groove to seal up the cell; and wherein in the second region, the protective circuit board is vertically inserted into the explosion-proof plug, the protective circuit board and the USB interface are integrally formed, and the positive electrode cap is disposed over the protective circuit board; the second region is a pressure relief region which comprises an interior of the positive electrode cap, an interior of the USB interface, and a path between the interior of the positive electrode cap and the interior of the USB interface, so that a pressure inside the rechargeable battery is released to the outside of the rechargeable battery through the interiors and the path.

21. A USB rechargeable battery, wherein the cell is assembled by using the cell assembly structure according to claim 14.

* * * * *